May 10, 1955　　　　　G. MAY　　　　　2,708,121

TOWING HITCH

Filed Dec. 19, 1952

INVENTOR.
GEORGE MAY
BY
Barney, Kisselle, Laughlin & Raisch
ATTORNEYS.

United States Patent Office 2,708,121
Patented May 10, 1955

2,708,121

TOWING HITCH

George May, Lincoln Park, Mich., assignor to May Brothers Manufacturing Company, Incorporated, Lincoln Park, Mich., a corporation of Michigan Application December 19, 1952, Serial No. 326,920

2 Claims. (Cl. 280—480)

This invention relates to a grappling device suitable for general use in towing or lifting, and particularly adapted for use as a hitch for the towing of automotive vehicles.

In the towing of one automotive vehicle by another, a chain, rope, or wire cable is usually used, which is usually secured to one or both vehicles by tying it to a frame extension member or to some part of the bumper, and which frequently is equipped with a hook on each end to facilitate the attachment. It would be desirable to be able to secure the towing line to the bumper by means of a hitching device, thus eliminating the necessity for wrapping or tying the line to some less accessible part of the vehicle and eliminating the possibility of an insecure attachment or such an attachment as would be harmful to the vehicles. However, the bumpers found on automotive vehicles vary so widely in size and shape that no single hitch of the ordinary rigid construction will fit a substantial number of the various types.

A primary purpose of this invention is to provide a hitching device which is adjustable to fit substantially all of the bumpers in use on automotive vehicles, simple of construction and operation, and suitable for introduction on the mass market. One form of this invention is disclosed in the accompanying drawings.

Figure 1:
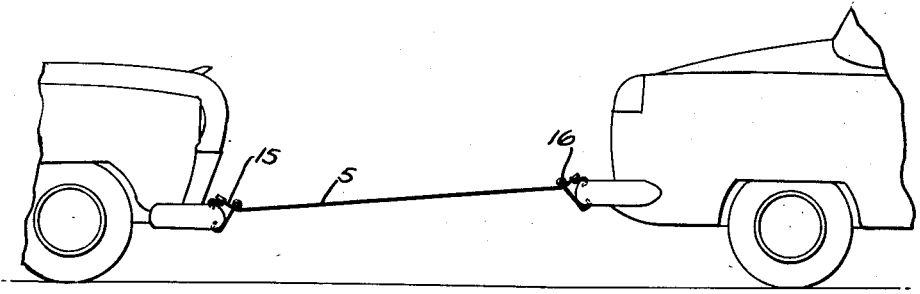
Fig. 1 is an illustration depicting the hitch in its preferred use.

It should be understood that such terms as "upper clamp" and "lower clamp" are used herein merely as convenient terminology, not as delimitations; and that the towing hitch is merely a preferred, not the exclusive, embodiment of this invention.

The hitch has an upper clamp 1 made of relatively heavy gauge strap steel substantially U-shaped in cross section and may have an embossed deformity 2 for reinforcement purposes. The longer of the legs of this clamp has an end portion 3 extending laterally therefrom and having a hole 4 therein through which is threaded a towing line 5.

The hitch has a lower clamp 6 also made of relatively heavy gauge strap steel, the lower end 7 being substantially a reflection of the upper clamp 1 as to U-shape and reinforcing deformity. However, the lower clamp may have a relatively long, straight intermediate portion or shank 8, the upper end of which is formed into a substantially circular cylindrical bight 9. Near the top of the shank is a hole 10 through which is threaded the towing line 5.

Figure 7:
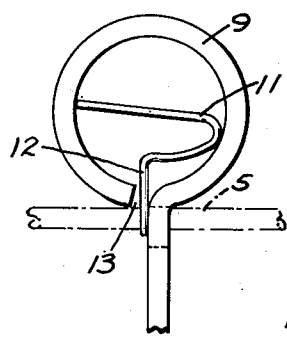
Fig. 7 is an enlarged view showing the interrelation of the friction clip, the cable and the circular bight of the lower clamp.

A friction clip 11, having a port 12 which is preferably approximately V-shaped, is slidably inserted into the bight 9 so that the port 12 extends through the opening 13 of the bight and rests against the top of the shank 8 and so that the apex of the port 12 is aligned with hole 10 substantially as shown in Fig. 7. The cable 5 is threaded through the port 12 for reasons which will be seen shortly. The clip is made preferably of spring steel and is so fashioned as to fit tightly into its place.

Figure 2:
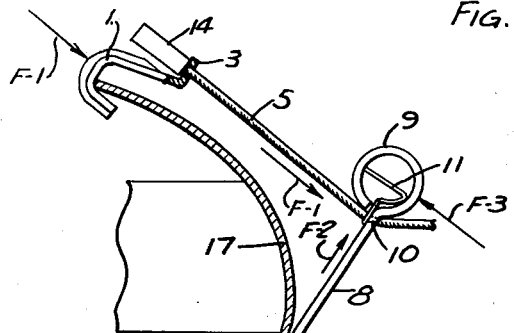
Fig. 2 is a view demonstrating the method of attaching the hitch to a typical automotive vehicle bumper.
Figure 3:
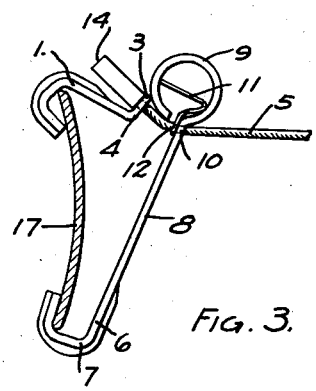
Fig. 3 is similar to Fig. 2, showing the hitch applied to a bumper of different cross section.
Figure 4:
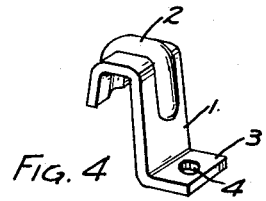
Fig. 4 is a perspective view of the upper clamp showing a deformity or channel imposed for strengthening purposes.
Figure 5:
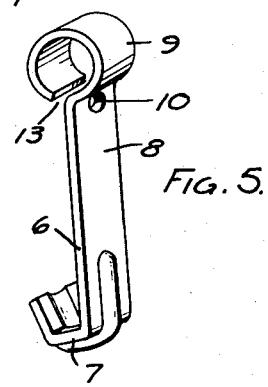
Fig. 5 is similar to Fig. 4 showing the lower clamp.
Figure 6:
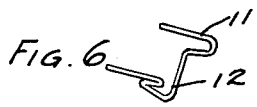
Fig. 6 is a perspective view of the friction clip which is inserted in the circular bight of the lower clamp.
Figure 8:
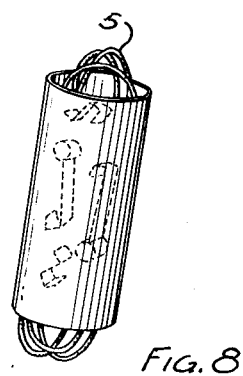
Fig. 8 shows a container which may be provided for the device.

The towing line 5 is threaded through hole 4, port 12 and hole 10 as shown in Figs. 2 and 3. A lug or stop 14 is secured to the end of the towing line to prevent the end from being pulled through hole 4. It should be understood that both ends of the towing line are similarly treated so that a hitch 15 is provided at one end for attachment to the towed vehicle and an identical hitch 16 is provided at the other end for attachment to the towing vehicle as illustrated in Fig. 1.

In use, the upper clamp 1 is hooked around the upper edge of the bumper 17 and the lower end 7 of the lower clamp 6 is hooked around the lower edge of the bumper 17. The towing line is pulled through hole 4, port 12 and hole 10 until the stop 9 rests snugly against the lateral extension 3 of the upper clamp 1, whereupon the parts of the hitch assume the relative positions shown in Fig. 1 or Fig. 2. In this position the parts form a compound lever so that the towing force applied to the towing line is resolved into component forces as shown in Fig. 2; F-1 urging the upper clamp 1 into tighter engagement with the upper edge of the bumper 17, F-2 urging the lower end 7 of the lower clamp into tighter engagement with the lower edge of the bumper 17 and other components which may be represented by F-3 urging the bight 9 in a direction toward the upper clamp 1, thus drawing the clamps convergently toward a point forward of the bumper and tending to close the hitch more tightly. When towing force is applied, the system adjusts itself to a condition of equilibrium. Also, as shown in Fig. 3, the bight may serve as a butting surface for the upper clamp when the hitch is used on a small bumper; and, of course, the bight serves as a receptacle for the friction clip.

The purpose of the friction clip 11 is to prevent the towing line 5 from slipping through hole 10 when no force is being applied to the towing line, for example, after the initial adjustment of the hitch on the bumper and before towing begins, or during periods when the towing line is slack while the towing is in progress. The clip is so positioned and the port 12 is so formed that the towing line is gripped relatively firmly between the sides of the port and the top of hole 10 and lower surfaces of the bight 9, thus providing resistance to any movement of the towing line through hole 10. However, the clip and, of course, the port, are sufficiently resilient to permit such movement upon the application of a reasonable amount of manual force so that the hitch may easily be applied and removed from a bumper.

It is to be appreciated that the hitch is adjusted to fit the desired object by merely sliding the clamps along the towing line; thus the hitch may be adjusted to fit virtually any size or shape of bumper. Also, after the clamps have been hooked to the desired object, the hitch is closed merely by sliding the bight end of the lower clamp along the towing line toward the upper clamp. The friction clip then prevents the hitch from opening spontaneously. Thus, the towing line, in effect, serves also as one jaw of the hitch.

I claim:

1. A hitch for towing automotive vehicles comprising, a tow line formed of wire cable, a first clamp member having a hook portion for engaging around one edge of a bumper or the like, means securing said clamp member to one end of the tow line, a second clamp member, said second clamp member having an elongate shank with a hook portion at one end disposed oppositely to said hook portion of the first clamp member for engaging around the opposite edge of such bumper or the like, said shank having a curved portion at its other end forming a relatively large diameter, substantially cylindrical bight, the extremity of said curved portion being spaced from the adjacent portion thereof to form an aperture, said shank having an opening adjacent said bight, said tow line extending through said opening substantially tangentially to said bight, whereby said bight forms a mildly curved bearing surface for said tow line, and a spring wire clip frictionally secured within said bight, said clip having a port portion projecting through said aperture and frictionally embracing said tow line, said shank having a length generally approximating the distance between the edges of bumpers to which said hitch is adapted to be attached, whereby said tow line bears on said bight through a relatively small angular extent when in operative position and whereby towing force may be generally equally distributed between said clamp members.

2. The hitch defined in claim 1 wherein said first clamp member has a lateral portion with an aperture through which said tow line extends and wherein said tow line has an enlargement at its end engaging said lateral portion so that the entire portion of the tow line intermediate said clamp members extends in a substantially straight line during towing.

References Cited in the file of this patent

UNITED STATES PATENTS

| | | |
|---|---|---|
| 466,656 | Covert | Jan. 5, 1892 |
| 560,391 | Cheekley | May 19, 1896 |
| 1,879,991 | Pratt | Sept. 27, 1932 |
| 2,494,526 | Tungett et al. | Jan. 10, 1950 |
| 2,520,325 | Moore | Aug. 29, 1950 |
| 2,555,430 | Weeks | June 5, 1951 |